United States Patent [19]

Inoue

[11] 4,220,409
[45] Sep. 2, 1980

[54] FOCAL PLANE SHUTTER
[75] Inventor: Nobuyoshi Inoue, Kawagoe, Japan
[73] Assignee: Copal Company Limited, Tokyo, Japan
[21] Appl. No.: 867,297
[22] Filed: Jan. 5, 1978
[30] Foreign Application Priority Data
Jan. 11, 1977 [JP] Japan .................................. 52-1653
[51] Int. Cl.$^2$ .............................................. G03B 9/40
[52] U.S. Cl. ..................................... 354/247; 354/249
[58] Field of Search ............................... 354/241-244, 354/245-249

[56] References Cited
U.S. PATENT DOCUMENTS
3,532,046 10/1970 Wienchol ............................ 354/242

Primary Examiner—L. T. Hix
Assistant Examiner—Shelley Wade
Attorney, Agent, or Firm—Cushman, Darby & Cushman

[57] ABSTRACT

In each of the opening group and the closing group of shutter blades, there is a main blade and two auxiliary blades. When developing from a folded condition the blades of each group go from a more overlapped to a less overlapped condition. Although the same two springs may provide all three of the blades of a group with motive force for moving from the cocked to the uncocked condition, the two auxiliary blades have a driving force transmitter that is independently movable to a limited degree relative to the driving force transmitter for the main blade of the same group, one of the springs directly transmits force for moving the main blade and the other spring directly transmits force for moving the auxiliary blades.

10 Claims, 7 Drawing Figures

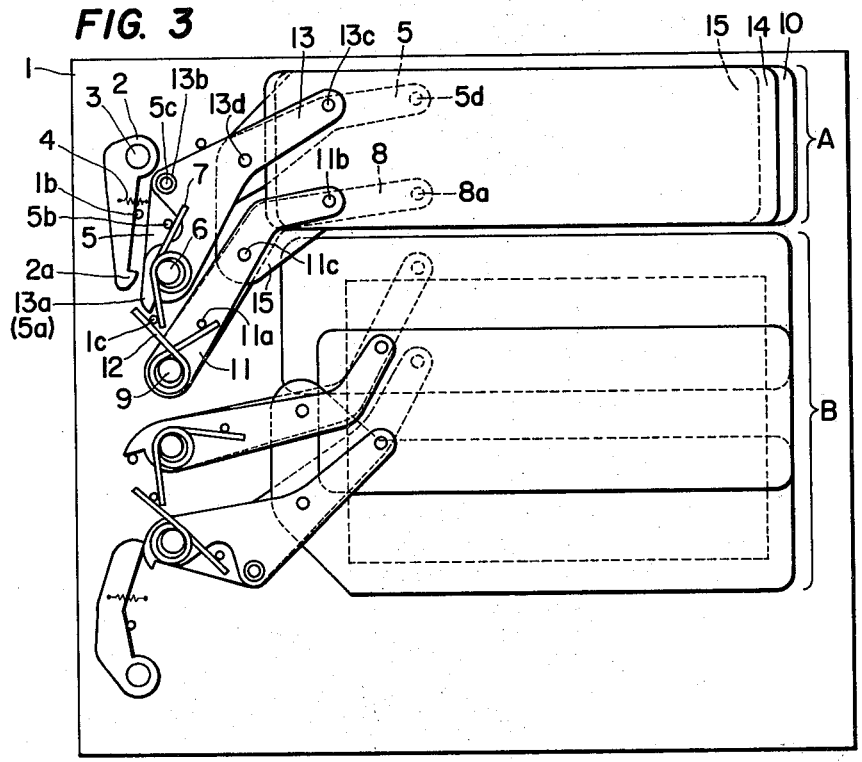
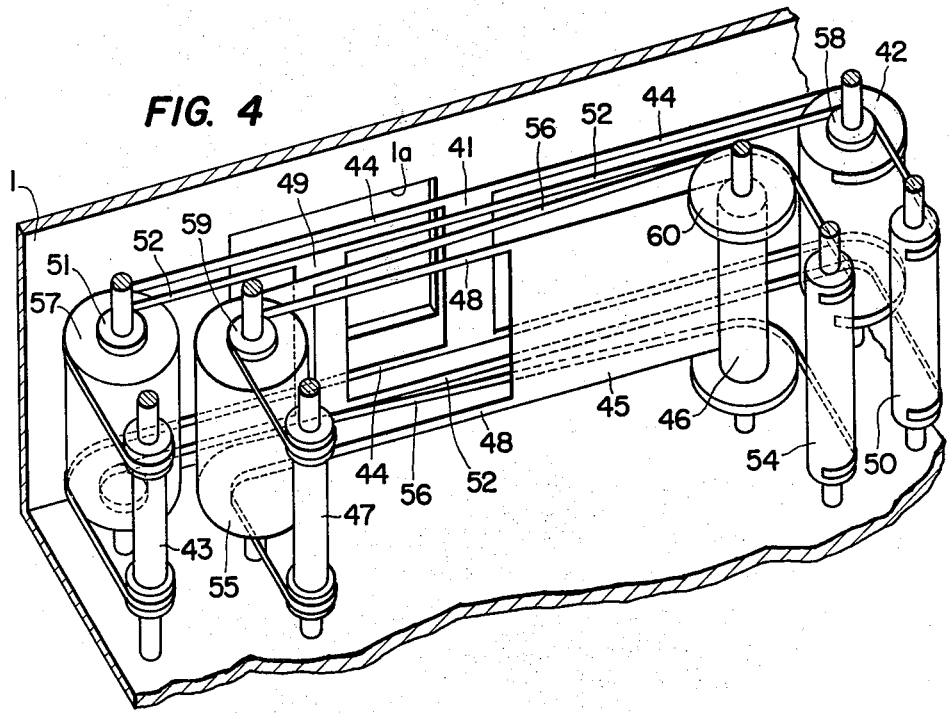

FOCAL PLANE SHUTTER

BACKGROUND OF THE INVENTION (a) Field of the Invention

The present invention relates to improvements in a focal plane shutter for photographic cameras.

(b) Description of the Prior Art

In conventional focal plane shutters, shutter curtains are used or a plurality of opaque laminar shutter blades are used. In either of them, front curtains or front blades for opening the shutter and rear curtains or rear blades for closing the shutter are so arranged as to be run by a single driving force source. Therefore, all of such factors as the mass and frictional resistance of all the shutter curtains or shutter blades act as loads on this single driving force source. Therefore, in order to make a high speed shutter, the resiliency of a spring to be used for the driving force source must be made very high. However, if a strong spring is used, undesirable stresses will be produced in the component parts and part connecting portions and, as a result, the durability of the shutter will be reduced.

In the conventional focal plane shutter, in order to avoid such reduction of the durability as is mentioned above, a comparatively weak spring must be used, thereby the shutter speed fluctuates and the running speed of the shutter curtains or shutter blades themselves is, as a result comparatively low. This means that the width of the exposure slit of the shutter will become so narrow that the range of the shutter speeds at which a stroboflash can be utilized will become narrower.

SUMMARY OF THE INVENTION

An object of the present invention is to provide a focal plane shutter arranged so as to be able to elevate the running speed of shutter blades or shutter curtains themselves though comparatively weak springs are used in view of the above mentioned circumstances.

According to the present invention, this object is attained by dividing a light intercepting member running parallel with the surface of a film just before the film to expose the film into a main cover part for forming an exposure slit and an auxiliary cover part for covering an exposure aperture and running the main cover part and auxiliary cover part respectively with independent driving means.

According to a preferred formation of the present invention, the main cover part is formed of a rectangular opaque lamina and the auxiliary cover part consists of a plurality of rectangular opaque laminae overlapped in turn on the main cover part.

According to another formation of the present invention, the main cover part is formed of a rectangular opaque curtain and the auxiliary cover part is formed of a rectangular opaque curtain overlapped on the main cover part.

This and other objects of the present invention will become more apparent during the course of the following detailed description and appended claims.

BRIEF DESCRIPTION OF THE DRAWINGS

FIG. 3 is an elevational view showing the shutter shown in FIG. 1 which is in the uncocked state;

FIG. 4 is a perspective view showing another embodiment of the focal plane shutter according to the present invention when an exposure is started.

DESCRIPTION OF THE PREFERRED EMBODIMENT

Figures 1, 2:
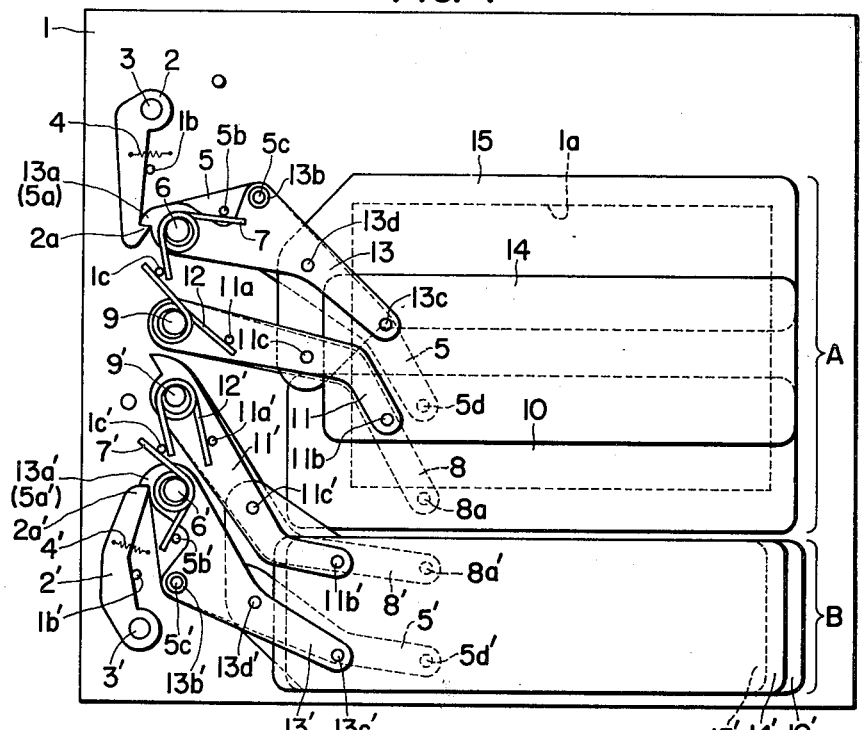
FIG. 1 is an elevational view showing an embodiment of the focal plane shutter according to the present invention which is in the cocked state.
FIG. 2 is an elevational view showing the shutter shown in FIG. 1 which is fully opened.

In FIGS. 1 and 3, reference numeral 1 indicates a shutter base plate having an exposure aperture 1a and pins 1b and 1c. 2 indicates an opening release lever rotatably supported on the base plate 1 by a shaft 3, biased counterclockwise by a spring 4, restricted in the counterclockwise rotation by the pin 1b and forming a hook portion 2a. 5 indicates a supporting arm rotatably supported on the base plate 1 by a shaft 6, biased counterclockwise by a driving spring 7, having a hook portion 5a engageable with the hook portion 2a of the opening release lever 2, pins 5b and 5c and a shaft 5d. 8 indicates a supporting arm rotatably supported on the base plate 1 by a shaft 9 and having a shaft 8a. 10 indicates a main cover blade pivoted on the supporting arms 5 and 8 respectively by the shafts 5d and 8a and used to form an exposure slit. 11 indicates a supporting arm rotatably supported on the base plate 1 by the shaft 9, biased counterclockwise by a driving spring 12 and having a pin 11a and shafts 11b and 11c. 13 indicates a supporting arm rotatably supported on the base plate 1 by the shaft 6 and having a hook portion 13a engageable with the hook portion 2a of the opening release lever 2, a hole 13b in which the pin 5c of the supporting arm 5 fits with some play and shafts 13c and 13d. 14 indicates an auxiliary cover blade pivoted on the supporting arms 11 and 13 respectively by the shafts 11b and 13c to cover the exposure aperture 1a. 15 Indicates an auxiliary cover blade pivoted on the supporting arms 11 and 13 respectively by the shafts 11c and 13d to cover the exposure aperture 1a.

The main cover blade 10 and auxiliary cover blades 14 and 15 are each made of a substantially rectangular opaque lamina and are arranged so as to intercept the light to the film by covering the exposure aperture 1a when fully developed and to make the light incident upon the film by opening the exposure aperture 1a when completely folded.

The supporting arms 5, 8, 11 and 13, driving springs 7 and 12, main cover blade 10 and auxiliary cover blades 14 and 15 constitute a shutter opening blade group or front blade group A. Symbol B indicates a shutter closing blade group or rear blade group. This rear blade group B has substantially the same constitution as of the front blade group A except that the rear blade group B is arranged symmetrically with the front blade group A with respect to the exposure aperture 1a. Therefore substantially the same parts as the component parts of the front blade group A shall be only indicated by the reference numerals used for the front blade group A with dashes attached to them and the explanation of the detail of the structure will not be repeated here. When the front blade group A is developed, the rear blade group B will be folded. When the rear blade group B is developed, the front blade group A will be folded. On the exposure aperture 1a, an exposure slit is formed by the lower edge of the main cover blade 10 and the upper edge of the main cover blade 10'.

The operation of this shutter is as follows.

The shutter is released by rotating the opening release lever 2 clockwise in FIG. 1. That is to say, by the clockwise rotation of the opening release lever 2, the hook portion 2a will be simultaneously released from the hook portions 5a and 13a and thereby the supporting arms 5 and 13 will be released simultaneously. Therefore, the front blade group A will be operated to open the exposure aperture 1a by the driving springs 7 and 12. This operation independent operations of the main cover blade 10 and auxiliary cover blades 14 and 15 which are somewhat independent of one another in a limited range. That is to say, the main cover blade 10 is pivoted on the supporting arms 5 and 8. These supporting arms are not directly connected to the supporting arms 11 and 13 pivoting the auxiliary cover blades 14 and 15 and the pin 5c is fitted in the hole 13b with some play. Therefore, the supporting arm 13 can operate freely from the supporting arm 5 within a range allowable by the above mentioned play. In this case, due to the above mentioned play, the amount of the overlap between the main cover blade 10 and auxiliary cover blade 14 will somewhat vary. The size of this play is so predetermined as to produce no light leakage by the decrease of the amount of the overlap. By the clockwise rotation of the opening release lever 2 from the state in FIG. 1, as mentioned above, the supporting arms 5 and 13 will be simultaneously released and will be rotated counterclockwise respectively by the driving springs 7 and 12. These driving springs can be adjusted in the strength in response to their loads. Therefore, a pair of supporting arms 5 and 8 and another pair of supporting arms 11 and 13 can be operated substantially at the same speed. After the lapse of a predetermined time after the front blade group A rises while being folded and starts the operation of opening the aperture 1a as described above, the closing release lever 2' will be rotated counterclockwise by a shutter speed controlling means not illustrated and the rear blade group B will rise while being developed in the same manner as is described above and will close the aperture 1a to be in the state in FIG. 3.

The cocking operation to the cocked state in FIG. 1 from the state in FIG. 3 is made by simultaneously clockwise rotating the supporting arms 5, 8, 11, 13, 5', 8', 11' and 13' and locking the supporting arms 5 and 13 with the lever 2 and the supporting arms 5' and 13' with the lever 2' by a cocking means not illustrated but well known in this kind of shutter.

Figure 5:
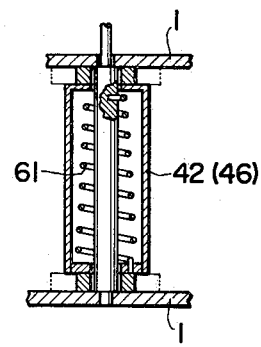
FIGS. 5 and 6 are respectively enlarged sectional views of two different driving drums used for the shutter shown in FIG. 4.
Figure 6:
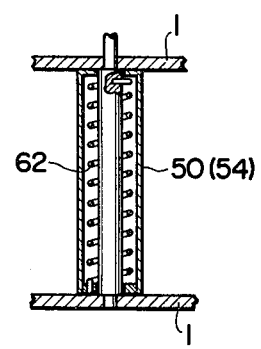

In the above is shown an embodiment of the present invention as applied to a blade type focal plane shutter. However, the present invention can be applied also to a curtain type focal plane shutter in which the exposure slit runs in the lateral direction of the exposure aperture 1a. This shall be briefly explained in the following with reference to FIGS. 4 to 7. Reference numeral 41 indicates a rectangular opening main cover curtain integrally formed with a ribbon 44 stretched between a driving drum 42 and winding shaft 43. 45 indicates a rectangular opening auxiliary cover curtain integrally formed with a ribbon 48 stretched between a driving drum 46 and winding shaft 47. 49 indicates a rectangular closing main cover curtain integrally formed with a ribbon 52 stretched between a driving drum 50 and winding shaft 51. 53 indicates a rectangular closing auxiliary cover curtain integrally formed with a ribbon 56 stretched between a driving drum 54 and winding shaft 55. 57, 58, 59 and 60 indicate rollers. Symbol S indicates an exposure slit formed by the opening main cover curtain 41 and closing main cover curtain 49. This slit S operates in the direction indicated by the arrow just before the exposure aperture 1a so as to expose the film to the light. As shown in FIG. 5, within each of the driving drums 42 and 46 is housed a coil spring 61 biasing each of the driving drums 42 and 46 clockwise in FIGS. 4 and 7. As shown in FIG. 6, within each of the driving drums 50 and 54 is housed a coil spring 62 biasing each of the driving drums 50 and 54 clockwise in FIGS. 4 and 7.

Figure 7:
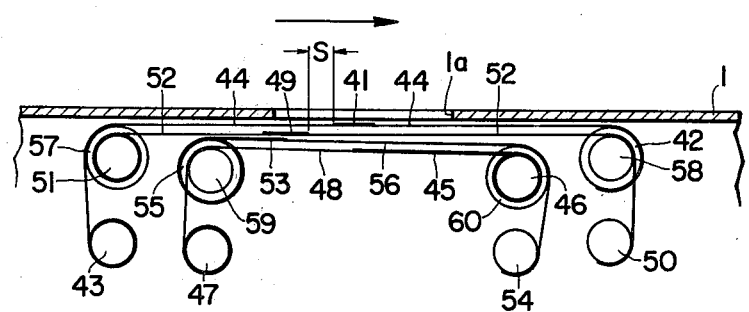
FIG. 7 is a schematic plan view of the shutter shown in FIG. 4.

FIGS. 4 and 7 show an exposing operation to a curtain type focal plane shutter. In this state, the slit S is formed by the opening main cover curtain 41 and closing main cover curtain 49. One side of this slit S is covered with the opening auxiliary cover curtain 45 overlapped with the opening main cover curtain 41. The other side of the slit S is covered with the closing auxiliary cover curtain 53 overlapped with the closing main cover curtain 49. The opening main cover curtain 41 and opening auxiliary cover curtain 45 are so formed as to run while always keeping a fixed overlapping relation. The closing main cover curtain 49 and closing auxiliary cover curtain 53 are so formed as to run while always keeping a fixed overlapping relation. Therefore, the film is exposed only by the slit S running in the direction indicated by the arrow just before the exposure aperture 1a. By the way, in the case of cocking the shutter, the same as in the case of a conventional ordinary curtain type shutter, the opening main cover curtain 41 and closing main cover curtain 49 will be moved in the direction reverse to the indication of the arrow while being kept overlapped and therefore the film will not be exposed. In the case of coking the shutter, the winding shafts 43, 47, 51 and 55 will be simultaneously rotated counterclockwise and, as a result, the driving springs 61 and 62 will be also simultaneously tensioned. As described above, even in this embodiment, the driving spring for running the main cover curtain and the driving spring for running the auxiliary cover curtain are respectively independent. Therefore, even if a driving spring comparatively weak as a whole is used, the running speed of the curtain will be able to be raised.

As described above, according to the present invention, a light intercepting member consisting of opaque blades or curtains running just before a film is divided into a main cover part to form an exposure slit and an auxiliary cover part overlapped on it to merely intercept the light to the film surface and the respective cover parts are operated respectively by independent driving force sources. Therefore, the spring torques will not concentrate in a part, the stresses will be dispersed and the durability of the shutter can be elevated. Further, for the same reasons, accurate shutter speeds are easy to obtain. As compared with the case of a lower curtain speed with the same shutter speed, the width of the exposure slit can be made larger and the usable range of a stroboflash can be enlarged.

I claim:

1. A shutter opening blade group assembly for a focal plane shutter for a camera which includes an exposure aperture and a shutter base plate, comprising:

three opening group shutter blades disposed in overlapping relation, and including one main shutter blade having an opening edge for an exposure slit to traverse the exposure aperture as an exposure is made, and two auxiliary blades for cooperating with the main shutter blade to fully obscure the exposure aperture until the exposure is begun;

the three opening group shutter blades being disposed in overlapping relation, so that blades of this group overlap with both the other auxiliary shutter blade of this group and the main shutter blade of this group, both before, while and following when an exposure is being made, i.e. when cocked, when folding, and when uncocked;

means movably mounting the three shutter blades of the opening group relative to the shutter base plate, including:
  (a) driving spring means mounted with respect to said shutter base plate;
  (b) driving force transmitting means interposed between said spring means and said three shutter blades of said opening group; and
  (c) releasable hook means for holding said driving force transmitting means against movement and said spring means cocked until said hook means is released;

the driving force transmitting means for the auxiliary shutter blades of the opening group being movable independently of the driving force transmitting means for the main shutter blade of the opening group, at least to a limited degree, so that during folding of the opening group, the spring means may move the main shutter blade of the opening group independently of the auxiliary blades of the opening group, at least to a limited degree;

said spring means comprising two separate springs, one primarily arranged for moving said main blade of said opening group and the other primarily arranged for moving said auxiliary blades of said opening group;

when the shutter opening blade group is in a developed, cocked condition, although said one auxiliary blade overlaps both said other auxiliary blade and said main blade of said opening group, said main blade not overlapping said other auxiliary blade, but when the shutter opening blade group is in a folded, uncocked condition, all three blades of the opening group being overlapped;

the driving force transmitting means for the main blade of the opening group comprises a first pair of laterally spaced supporting arms pivotally secured towards respective one ends thereof on the shutter base plate and pivotally secured towards respective other ends thereof to the main blade of said opening group generally parallelogram fashion; and the driving force transmitting means for the auxiliary blades of the opening group comprises a second pair of laterally spaced supporting arms pivotally secured towards respective one ends thereof on the shutter base plate and pivotally secured toward respective other ends thereof to each of said auxiliary blades of said opening group generally parallelogram fashion; and further including means loosely pinning at least one said supporting arm that is pivotally secured to said main blade of said opening group to at least one said supporting arm that is pivotally secured to said auxiliary blades of said opening group, so as to provide for differential pivoting of said two pairs of supporting arms to a degree limited by said loosely pinning means.

2. The shutter opening blade group assembly of claim 1 wherein:

respective one and other said supporting arms of the first-described pair for said opening blade group assembly are coaxially pivoted with respective one and other said supporting arms of the second-described pair for said opening blade group where said arms are pivoted to the shutter base plate, and said spring means includes a first driving spring bearing against said shutter base plate and said one supporting arm of said first-described pair for said shutter opening blade group assembly and a second driving spring bearing against said shutter base plate and the other said supporting arm of said second described pair for said shutter opening blade group assembly.

3. The shutter opening blade of claim 2, wherein:

the distance between where said one supporting arm of said first-described pair is pivoted to said shutter base plate and to said main blade of said opening group is longer than the distance between where said one supporting arm of said second-described pair is pivoted to said shutter base plate and to said one auxiliary blade of said opening group which is, in turn, longer than the distance between where said one supporting arm of said second-described pair is pivoted to said shutter base plate and to said other auxiliary blade of said opening group.

4. A shutter closing blade group assembly for a focal plane shutter for a camera, which includes an exposure aperture and a shutter base plate, comprising:

three closing group shutter blades disposed in overlapping relation, and including one main shutter blade having a closing edge for an exposure slit to traverse the exposure aperture as an exposure is made, and two auxiliary blades for cooperating with the main shutter blade to progressively fully obscure the exposure aperture as the exposure is begun;

the three closing group shutter blades being disposed in overlapping relation, so that blades of this group overlap with both the other auxiliary shutter blade of this group and the main shutter blade of this group, both before, while and following when an exposure is being made, i.e. when cocked, when developing, and when uncocked;

means movably mounting the three shutter blades of the closing group relative to the shutter base plate, including:
  (a) driving spring means mounted with respect to said shutter base plate;
  (b) driving force transmitting means interposed between said spring means and said three shutter blades of said closing group; and
  (c) releasable hook means for holding said driving force transmitting means against movement and said spring means cocked until said hook means is released;

the driving force transmitting means for the auxiliary shutter blades of the closing group being movable independently of the driving force transmitting means for the main shutter blade of the closing group; at least to a limited degree, so that during developing of the closing group, the spring means may move the main shutter blade of the closing group independently of the auxiliary blades of the closing group, at least to a limited degree;

said spring means comprising two separate springs, one primarily arranged for moving said main blade of said closing group and the other primarily arranged for moving said auxiliary blades of said closing group;

when the shutter closing blade group is in a developed uncocked condition, although said one auxiliary blade overlaps both said other auxiliary blade and said main blade of said closing group, said main blade not overlapping said other auxiliary blade, but when the shutter closing blade group is in a folded, cocked condition, all three blades of the closing group being overlapped;

the driving force transmitting means for the main blade of the closing group comprises a first pair of laterally spaced supporting arms pivotally secured towards respective one ends thereof on the shutter base plate and pivotally secured towards respective other ends thereof to the main blade of said closing group generally parallelogram fashion; and the driving force transmitting means for the auxiliary blades of the closing group comprises a second pair of laterally spaced supporting arms pivotally secured towards respective one ends thereof on the shutter base plate and pivotally secured toward respective other ends thereof to each of said auxiliary blades of said closing group generally parallelogram fashion; and further including means loosely pinning at least one said supporting arm that is pivotally secured to said main blade of said closing group to at least one said supporting arm that is pivotally secured to said auxiliary blades of said closing group, so as to provide for differential pivoting of said two pairs of supporting arms to a degree limited by said loosely pinning means.

5. The shutter closing blade group assembly of claim 4 wherein:

respective one and other said supporting arms of the first-described pair for said closing blade group assembly are coaxially pivoted with respective one and other said supporting arms of the second-described pair for said closing blade group where said arms are pivoted to the shutter base plate, and said spring means includes a first driving spring bearing against said shutter base plate and said one supporting arm of said first-described pair for said shutter closing blade group assembly and a second driving spring bearing against said shutter base plate and the other said supporting arm of said second described pair for said shutter closing blade group assembly.

6. The shutter closing blade of claim 5, wherein: the distance between where said one supporting arm of said first-described pair is pivoted to said shutter base plate and to said main blade of said closing group is longer than the distance between where said one supporting arm of said second-described pair is pivoted to said shutter base plate and to said one auxiliary blade of said closing group which is, in turn, longer than the distance between where said one supporting arm of said second-described pair is pivoted to said shutter base plate and to said other auxiliary blade of said closing group.

7. A focal plane shutter for cameras comprising a shutter base plate having an exposure aperture thereon; a shutter opening blade group movable between its cocked position and its uncocked position to open said exposure aperture; a shutter closing blade group movable between its cocked position and its uncocked position to close said exposure aperture; each of said shutter opening blade group and shutter closing blade group consisting of a first pair of supporting arms respectively rotatably supported on said shutter base plate, a second pair of supporting arms respectively rotatably supported on said shutter base plate, a main cover blade for forming an exposure slit on said exposure aperture pivotably supported on said first pair of supporting arms, a plurality of auxiliary cover blades pivotably supported respectively on said second pair of supporting arms and overlapped in turn on said main cover blade so as to be able to cover said exposure aperture, a first driving spring connected between said shutter base plate and one of said first pair of supporting arms to move said first pair of supporting arms from their cocked positions to their uncocked positions, and a second driving spring connected between said shutter base plate and one of said second pair of supporting arms from their cocked positions to their uncocked positions;

one of said second pair of supporting arms having a hole and one of said first pair of supporting arms having a pin fitted in said hole with some play.

8. A focal plane shutter for cameras according to claim 7 wherein:

said shutter further comprises a release lever member rotatably supported on said shutter base plate, and one of said first pair of supporting arms and one of said second pair of supporting arms are arranged so as to be able to be locked in their cocked positions at the same time by said release lever member.

9. A focal plane shutter for cameras according to claim 8 wherein:

one of said first pair of supporting arms and one of said second pair of supporting arms are coaxially supported and the other of said first pair of supporting arms and the other of said second pair of supporting arms are coaxially supported.

10. A focal plane shutter for cameras according to claim 9 wherein:

said first pair of supporting arms are longer than said second pair of supporting arms.

* * * * *